US009493615B2

(12) United States Patent
Backer et al.

(10) Patent No.: US 9,493,615 B2
(45) Date of Patent: Nov. 15, 2016

(54) ORGANOPOLYSILOXANES CONTAINING AN UNSATURATED GROUP

(75) Inventors: Michael Backer, Marbais (BE); Francois De Buyl, Hoeilaart (BE); Damien Deheunynck, Braine L'Alleud (BE); Valerie Smits, Lobbes (BE)

(73) Assignee: Dow Corning Corporation, Midland, MI (US)

( * ) Notice: Subject to any disclaimer, the term of this patent is extended or adjusted under 35 U.S.C. 154(b) by 836 days.

(21) Appl. No.: 13/520,929

(22) PCT Filed: Dec. 22, 2010

(86) PCT No.: PCT/EP2010/070481
§ 371 (c)(1),
(2), (4) Date: Jul. 6, 2012

(87) PCT Pub. No.: WO2011/083044
PCT Pub. Date: Jul. 14, 2011

(65) Prior Publication Data
US 2012/0283362 A1 Nov. 8, 2012

(30) Foreign Application Priority Data
Jan. 6, 2010 (GB) .................................. 1000117.0

(51) Int. Cl.
*C08L 23/04* (2006.01)
*C08G 77/20* (2006.01)
*C08G 77/16* (2006.01)
*C08L 23/10* (2006.01)

(52) U.S. Cl.
CPC ............... *C08G 77/20* (2013.01); *C08L 23/04* (2013.01); *C08G 77/16* (2013.01); *C08L 23/10* (2013.01)

(58) Field of Classification Search
CPC ......... C08G 77/16; C08G 7/20; C08L 23/04; C08L 23/10; C08L 83/00
See application file for complete search history.

(56) References Cited

U.S. PATENT DOCUMENTS

| | | |
|---|---|---|
| 3,075,948 A | 1/1963 | Santelli |
| 3,179,612 A * | 4/1965 | Plueddemann ....... C07F 7/0834 106/287.14 |
| 3,249,464 A * | 5/1966 | Nelson ..................... C03C 17/30 156/329 |
| 3,258,477 A | 6/1966 | Plueddemann et al. |
| 3,414,551 A | 12/1968 | Reid et al. |
| 3,458,460 A | 7/1969 | Shepard et al. |
| 3,503,943 A | 3/1970 | Kresge et al. |
| 3,646,155 A | 2/1972 | Scott |
| 3,873,642 A | 3/1975 | Jezl |
| 3,873,643 A | 3/1975 | Wu et al. |
| 4,303,763 A | 12/1981 | Beasley |
| 4,481,322 A | 11/1984 | Godlewski et al. |
| 4,529,750 A | 7/1985 | Gimpel |
| 4,702,868 A | 10/1987 | Pontiff et al. |
| 4,709,084 A | 11/1987 | Pavlin et al. |
| 4,730,031 A | 3/1988 | Sato et al. |
| 4,755,262 A | 7/1988 | Matsunaga et al. |
| 4,795,785 A | 1/1989 | Ito et al. |
| 4,857,250 A | 8/1989 | Gale et al. |
| 4,921,916 A | 5/1990 | Howell et al. |
| 4,946,977 A | 8/1990 | Bernhardt et al. |
| 4,990,383 A | 2/1991 | Bergstrom et al. |
| 5,233,006 A | 8/1993 | Wolter et al. |
| 5,373,059 A | 12/1994 | Asanuma et al. |
| 5,382,633 A | 1/1995 | Scott et al. |
| 5,532,398 A | 7/1996 | Wolter et al. |
| 5,661,200 A | 8/1997 | Boudreaux, Jr. et al. |
| 5,684,171 A | 11/1997 | Wideman et al. |
| 5,852,099 A | 12/1998 | Vanel |
| 5,929,127 A | 7/1999 | Raetzsch et al. |
| 6,013,715 A | 1/2000 | Gornowicz et al. |
| 6,028,146 A | 2/2000 | Kotlar et al. |
| 6,090,902 A * | 7/2000 | Kuo et al. ..................... 526/279 |
| 6,140,445 A | 10/2000 | Su et al. |
| 6,153,691 A | 11/2000 | Gornowicz et al. |
| 6,177,519 B1 | 1/2001 | Chung et al. |
| 6,380,316 B1 | 4/2002 | Bahadur et al. |

(Continued)

FOREIGN PATENT DOCUMENTS

| | | |
|---|---|---|
| BE | 652324 A | 2/1965 |
| CA | 1099840 A1 | 4/1981 |

(Continued)

OTHER PUBLICATIONS

English language abstract and machine-assisted English translation for JP H06-032903 extracted from the PAJ database on Jan. 30, 2014, 53 pages.

(Continued)

*Primary Examiner* — Mark Kaucher
(74) *Attorney, Agent, or Firm* — Catherine U. Brown

(57) ABSTRACT

The invention provides a composition comprising a polyolefin and a polyorganosiloxane in which at least 50 mole % of the siloxane units are D units as herein defined and which contains at least one unsaturated group, characterized in that the unsaturated group is group of the formula —X—CH=CH—R" (I) or —X—C≡C—R" (II), in which X represents a divalent organic linkage having an electron withdrawing effect with respect to the —CH=CH— or —C≡C— bond and/or containing an aromatic ring or a further olefinic double bond or acetylenic unsaturation, the aromatic ring or the further olefinic double bond or acetylenic unsaturation being conjugated with the olefinic unsaturation of —X—CH=CH—R" or with the acetylenic unsaturation of —X—C≡C—R" and R" represents hydrogen or a group having an electron withdrawing effect or any other activation effect with respect to the —CH=CH— or —C≡C— bond.

20 Claims, No Drawings

(56) References Cited

U.S. PATENT DOCUMENTS

| | | | |
|---|---|---|---|
| 6,479,580 B1 | 11/2002 | Chorvath et al. | |
| 6,500,883 B1 | 12/2002 | Mack et al. | |
| 6,590,032 B2 | 7/2003 | Furukawa et al. | |
| 6,590,036 B2 | 7/2003 | Koike et al. | |
| 6,590,039 B1 | 7/2003 | Wang et al. | |
| 6,632,888 B2 | 10/2003 | Obrecht et al. | |
| 6,774,255 B1 | 8/2004 | Tardivat et al. | |
| 6,841,694 B2 | 1/2005 | Pfeiffer | |
| 6,864,322 B2 | 3/2005 | Gehlsen et al. | |
| 6,864,323 B2 | 3/2005 | Schlosser et al. | |
| 6,875,823 B2 | 4/2005 | Kondo et al. | |
| 6,984,747 B2 | 1/2006 | Jacob et al. | |
| 7,015,297 B2 | 3/2006 | Schindler et al. | |
| 7,041,744 B2 | 5/2006 | Palmlof et al. | |
| 7,074,876 B2 | 7/2006 | Cruse et al. | |
| 7,078,449 B2 | 7/2006 | Pagano et al. | |
| 7,238,740 B2 | 7/2007 | Belin et al. | |
| 7,241,824 B2 | 7/2007 | Mangeret et al. | |
| 8,008,524 B2 | 8/2011 | Cruse et al. | |
| 8,013,178 B2 | 9/2011 | Klockmann et al. | |
| 2002/0040101 A1* | 4/2002 | Furukawa | C08L 23/02 525/100 |
| 2003/0114604 A1 | 6/2003 | Schlosser et al. | |
| 2003/0139621 A1 | 7/2003 | Jacob et al. | |
| 2003/0144403 A1 | 7/2003 | Barruel et al. | |
| 2005/0004386 A1 | 1/2005 | Deschler et al. | |
| 2005/0031813 A1 | 2/2005 | Conrnette et al. | |
| 2005/0107551 A1 | 5/2005 | Lang et al. | |
| 2005/0119436 A1 | 6/2005 | Ziche et al. | |
| 2005/0131154 A1 | 6/2005 | Cai et al. | |
| 2005/0269737 A1 | 12/2005 | Hogge et al. | |
| 2005/0272867 A1 | 12/2005 | Hogge et al. | |
| 2005/0287300 A1 | 12/2005 | Herrwerth et al. | |
| 2006/0025506 A1 | 2/2006 | Weller et al. | |
| 2006/0223943 A1* | 10/2006 | Sakamoto et al. | 525/242 |
| 2009/0143531 A1 | 6/2009 | Ouhadi et al. | |
| 2009/0186961 A1 | 7/2009 | Araujo Da Silva et al. | |
| 2009/0234066 A1 | 9/2009 | Araujo Da Silva et al. | |
| 2009/0264584 A1 | 10/2009 | Walia et al. | |
| 2010/0016500 A1 | 1/2010 | Sone et al. | |
| 2010/0040927 A1 | 2/2010 | Yoshida et al. | |
| 2010/0168343 A1 | 7/2010 | Harris et al. | |
| 2011/0152458 A1 | 6/2011 | Araujo Da Silva et al. | |
| 2011/0172367 A1 | 7/2011 | Backer et al. | |
| 2011/0178198 A1 | 7/2011 | Backer et al. | |
| 2011/0190411 A1 | 8/2011 | Backer et al. | |
| 2011/0287205 A1 | 11/2011 | Klockmann et al. | |
| 2012/0059121 A1 | 3/2012 | Backer et al. | |
| 2012/0065319 A1 | 3/2012 | Backer et al. | |
| 2012/0283346 A1 | 11/2012 | Backer et al. | |
| 2012/0283388 A1* | 11/2012 | Backer et al. | 525/106 |
| 2012/0289620 A1 | 11/2012 | Deheunynck et al. | |

FOREIGN PATENT DOCUMENTS

| | | | |
|---|---|---|---|
| CN | 1747976 A | 3/2006 | |
| DE | 10223073 C1 | 10/2003 | |
| DE | 102006059295 A1 | 6/2008 | |
| EP | 0225186 A2 | 6/1987 | |
| EP | 0245938 A2 | 11/1987 | |
| EP | 0276790 A2 | 8/1988 | |
| EP | 0372561 A2 | 6/1990 | |
| EP | 0581150 A2 | 2/1994 | |
| EP | 0735088 A1 | 10/1996 | |
| EP | 0776945 A2 | 6/1997 | |
| EP | 0809672 B1 | 12/1997 | |
| EP | 0900801 A1 | 3/1999 | |
| EP | 0943635 A1 | 9/1999 | |
| EP | 0451709 B1 | 12/1999 | |
| EP | 1018533 A2 | 7/2000 | |
| EP | 1022302 A2 | 7/2000 | |
| EP | 1050548 A1 | 11/2000 | |
| EP | 0450624 B1 | 9/2001 | |
| EP | 1134251 A1 | 9/2001 | |
| EP | 1270581 A2 | 1/2003 | |
| EP | 1318153 A1 | 6/2003 | |
| EP | 1323779 A1 | 7/2003 | |
| EP | 1354912 A1 | 10/2003 | |
| EP | 1375569 A1 | 1/2004 | |
| EP | 1619214 A1 | 1/2006 | |
| EP | 1683801 A2 | 7/2006 | |
| EP | 1721930 A1 | 11/2006 | |
| EP | 1818186 A1 | 8/2007 | |
| EP | 1942131 A1 | 7/2008 | |
| EP | 0958298 B2 | 10/2008 | |
| EP | 2039705 A1 | 3/2009 | |
| EP | 2085419 A1 | 8/2009 | |
| GB | 957917 A | 5/1964 | |
| GB | 1020740 A | 2/1966 | |
| GB | 1407827 | 9/1975 | |
| GB | 2134530 A | 8/1984 | |
| GB | 2192891 A | 1/1988 | |
| GB | 2202537 A | 2/1988 | |
| JP | 59-147035 A | 8/1984 | |
| JP | 3143979 A | 6/1991 | |
| JP | 05-070529 A | 3/1993 | |
| JP | H06-032903 A | 2/1994 | |
| JP | 06-172459 | 6/1994 | |
| JP | 2000-186122 A | 7/2000 | |
| JP | 2002105261 A * | 4/2002 | |
| JP | 2002513427 | 5/2002 | |
| JP | 2002513427 A | 5/2002 | |
| JP | 2004-292561 A | 10/2004 | |
| JP | 2005075996 | 3/2005 | |
| JP | 2005075996 A | 3/2005 | |
| JP | 2007-308653 A | 11/2007 | |
| JP | 2007329069 | 12/2007 | |
| JP | 2008097868 A | 4/2008 | |
| JP | 2008-106118 A | 5/2008 | |
| JP | 2008-184545 | 8/2008 | |
| WO | WO 87/05916 A2 | 10/1987 | |
| WO | WO 00/52072 A1 | 9/2000 | |
| WO | WO 00/52073 A1 | 9/2000 | |
| WO | WO 0052071 A1 | 9/2000 | |
| WO | WO 00/63293 A1 | 10/2000 | |
| WO | WO 01/49781 A1 | 7/2001 | |
| WO | WO 01/49782 A1 | 7/2001 | |
| WO | WO 01/49783 A1 | 7/2001 | |
| WO | WO 02/22728 A1 | 3/2002 | |
| WO | WO 03/091314 A1 | 11/2003 | |
| WO | WO 2004072135 A1 | 8/2004 | |
| WO | WO 2004/078813 A2 | 9/2004 | |
| WO | WO 2005/001037 A2 | 1/2005 | |
| WO | WO 2005/007066 A2 | 1/2005 | |
| WO | WO 2005/103061 A1 | 11/2005 | |
| WO | WO 2006/019468 A1 | 2/2006 | |
| WO | WO 2006015010 A2 | 2/2006 | |
| WO | WO 2006/125532 A1 | 11/2006 | |
| WO | WO 2006/125533 A1 | 11/2006 | |
| WO | WO 2006/125534 A1 | 11/2006 | |
| WO | WO 2007008765 A2 | 1/2007 | |
| WO | WO 2007/014687 A1 | 2/2007 | |
| WO | WO 2007/061550 A1 | 5/2007 | |
| WO | WO 2007147687 A1 | 12/2007 | |
| WO | WO 2008/042418 A1 | 4/2008 | |
| WO | WO 2009012113 A1 * | 1/2009 | C08F 255/02 |
| WO | WO 2009/073274 A1 | 6/2009 | |
| WO | WO 2010/000477 A1 | 1/2010 | |
| WO | WO 2010/000478 A1 | 1/2010 | |
| WO | WO 2010/000479 A1 | 1/2010 | |
| WO | WO 2010/003007 A2 | 1/2010 | |
| WO | WO 2010/005525 A1 | 1/2010 | |
| WO | WO 2010/125123 A1 | 11/2010 | |
| WO | WO 2010/125124 A1 | 11/2010 | |
| WO | WO 2011/083043 A1 | 7/2011 | |
| WO | WO 2011/083045 A1 | 7/2011 | |
| WO | WO 2011/083046 A1 | 7/2011 | |

OTHER PUBLICATIONS

English language abstract for JP 2000-186122 extracted from the espacenet.com database on Jan. 30, 2014, 12 pages.

(56) References Cited

OTHER PUBLICATIONS

English language abstract for JP 2004-292561 extracted from the espacenet.com database on Jan. 30, 2014, 10 pages.
No English language abstract for BE 652324; However, see English language equivalent GB 1020740. Orginal Document extracted from the espacenet.com database on Sep. 10, 2012, 13 pages.
English language abstract for EP 1318153 extracted from the espacenet.com database on Sep. 10, 2012, 11 pages.
International Search Report for Application No. PCT/EP2010/070481 dated Feb. 4, 2011, 3 pages.
English language abstract for DE 10223073 extracted from the espacenet.com database on Apr. 9, 2012, 10 pages.
English language abstract for EP 0450624 extracted from the espacenet.com database on Apr. 9, 2012, 36 pages.
English language abstract for EP 0451709 extracted from the espacenet.com database on Apr. 9, 2012, 24 pages.
English language abstract for EP 0735088 extracted from the espacenet.com database on Apr. 9, 2012, 13 pages.
English language abstract for EP 1683801 extracted from the espacenet.com database on Apr. 9, 2012, 49 pages.
English language abstract for JP 2008-106118 extracted from the PAJ database on Apr. 9, 2012, 27 pages.
English language abstract and translation for JP 2008-184545 extracted from the PAJ database on Apr. 9, 2012, 34 pages.
English language abstract for WO 01/49781 extracted from the espacenet.com database on Apr. 9, 2012, 49 pages.
English language abstract for WO 01/49782 extracted from the espacenet.com database on Apr. 9, 2012, 44 pages.
English language abstract for WO 01/49783 extracted from the espacenet.com database on Apr. 9, 2012, 36 pages.
English language abstract for WO 02/22728 extracted from the espacenet.com database on Apr. 9, 2012, 41 pages.
English language abstract for WO 2006/125532 extracted from the espacenet.com database on Apr. 9, 2012, 40 pages.
English language abstract for WO 2006/125533 extracted from the espacenet.com database on Apr. 9, 2012, 53 pages.
English language abstract for WO 2006/125534 extracted from the espacenet.com database on Apr. 9, 2012, 53 pages.
International Search Report for Application No. PCT/EP2010/055754 dated Oct. 15, 2010, 3 pages.
International Search Report for Application No. PCT/EP2010/055757 dated Jun. 7, 2010, 4 pages.
English language abstract not available for CN 1747976; However, see English language equivalent US 20090264584. Original Document extracted from the espacenet.com database on Aug. 3, 2012, 19 pages.
English language abstract for EP 0245938 extracted from the espacenet.com database on Jul. 13, 2011, 28 pages.
International Search Report for Application No. PCT/EP2009/004797 dated Sep. 4, 2009, 11 pages.
International Search Report for Application No. PCT/EP2009/004798 dated Sep. 1, 2009, 6 pages.
International Search Report for Application No. PCT/EP2009/004799 dated Sep. 9, 2009, 9 pages.
N.C. Liu et al.,"Influences of grafting formulations and processing conditions on properties of silane grafted moisture crosslinked polypropylenes", Polymer 41 (2000), pp. 4537-4542.
H. Huang et al.,"Influences on grafting formulations and extrusion conditions on properties of silane grafted polypropylenes", Applied Polymer Science 78 (2000), pp. 1233-1238.
Shujing Yang et al., "Mechanism of a One-Step Method for Preparing Silane Grafting and Crosslinking Polypropylene", Polymer Engineering and Science, 2007, pp. 1004-1008.
March's Advanced Organic Chemistry, 5th Edition, John Wiley & Sons, NY 2001, at chapter 15-58, pp. 1062-1063.
B.C. Ranu et al., "Significant rate acceleration of the aza-Michael reaction in water", Tetrahedron Letters 48 (2007), pp. 141-143.
International Search Report for Application No. PCT/EP2010/070480 dated Mar. 4, 2011, 4 pages.
International Search Report for Application No. PCT/EP2010/070482 dated Feb. 2, 2011, 4 pages.
The Vanderbilt Rubber Handbook (1978), pp. 344-346.
Do Hung Han et al., "Crosslinking and degradation of polypropylene by electron beam irradiation in the presence of trifunctional monomers", Radiation Physics and Chemistry 69 (2004) 239-244.
Coiai S. et al., "Control of Degradation Reactions during Radical Functionalization of Polypropylene in the Melt", vol. 37, No. 22, Nov. 2, 2004, pp. 8414-8423.
Deng Changfu et al., "Grafting of Maleic Anhydride onto Hyperbranched Polyethylene and Suppression of Chain Degradation and Crosslinking Side Reactions", No. 5, 2008, pp. 435-441.
Liu et al., "Reactive Adsorption of Aminosilane onto the Glycidyl Methacrylate Graft-Copolymerized Poly (tetrafluoroethylene) Film Surface for Adhesion Enhancement with Evaporated Copper", Journal of Polymer Science: Part A Polymer Chemistry, vol. 38, No. 1, Jan. 2000, pp. 80-89.
English language abstract and translation for JP 06-172459 extracted from the PAJ database on Jul. 13, 2011, 25 pages.
English language abstract and translation for JP 2007329069 extracted from the PAJ database on Jul. 13, 2012, 26 pages.
English language abstract for JP 2008097868 extracted from the espacenet.com database on Jul. 13, 2012, 33 pages.
English language abstract for JP 59-147035 extracted from the PAJ database on Oct. 31, 2012, 9 pages.
English language abstract and translation for JP 2007-308653 extracted from the PAJ database on Oct. 31, 2012, 71 pages.
English language abstract and translation extracted for JP 05-070529 from the PAJ database on Oct. 31, 2012, 76 pages.
English language abstract for EP 0735088 extracted from the espacenet.com database on Nov. 5, 2012, 13 pages.
English language abstract and machine-assisted English translation for DE 102006059295 extracted from the espacenet.com database on Nov. 5, 2012, 39 pages.
English language abstract for JP 3143979 extracted from the espacenet.com database on Nov. 5, 2012, 12 pages.
English language abstract not found; however, see English language equivalent U.S. Pat. No. 6,140,445. Original document extracted from espacenet.com database on Apr. 9, 2014, 7 pages.
English language abstract and machine-assisted English translation for JP 2005075996 extracted from espacenet.com database on Apr. 9, 2014, 49 pages.

* cited by examiner

ORGANOPOLYSILOXANES CONTAINING AN UNSATURATED GROUP

RELATED APPLICATIONS

This application is the National Stage of International Patent Application No. PCT/EP2010/070481, filed on Dec. 22, 2010 which claims priority to Great Britain Patent Application No. GB 1000117.0, filed on Jan. 6, 2010.

This invention relates to organopolysiloxanes containing an unsaturated group. It also relates to polymer compositions comprising the organopolysiloxanes and a polyolefin, which compositions can form stabilized polymer blends in which the organopolysiloxane is at least partly grafted to the polyolefin. The invention also relates to the grafting process and to the stabilized polymer blends produced by the grafting process.

U.S. Pat. No. 6,013,715 describes a thermoplastic elastomer prepared by mixing a polyolefin, a diorganopolysiloxane having an average of at least 2 alkenyl radicals per molecule, an organohydrido silicon compound having an average of at least 2 Si—H groups per molecule and a hydrosilylation catalyst, and dynamically curing the diorganopolysiloxane. U.S. Pat. No. 6,153,691 describes a thermoplastic elastomer prepared by mixing a polyolefin, a silanol-terminated diorganopolysiloxane, an organohydrido silicon compound having an average of at least 2 Si—H groups per molecule and a condensation catalyst, and dynamically curing the diorganopolysiloxane.

U.S. Pat. No. 6,479,580 describes a thermoplastic elastomer prepared by mixing a polyolefin, a diorganopolysiloxane gum having an average of at least 2 alkenyl radicals per molecule, and a radical initiator, and dynamically vulcanizing the diorganopolysiloxane gum.

The modification of polyolefin resins by grafting a specific compound onto a polymer backbone to improve properties is known. BE 652324 and U.S. Pat. No. 3,414,551 describe a process for reacting maleic anhydride with polypropylene. U.S. Pat. No. 3,873,643 describes the grafting of cyclic ethylenically unsaturated carboxylic acids and anhydrides onto polyethylene, under melt conditions and in presence of a peroxide.

U.S. Pat. No. 3,646,155 describes crosslinking of polyolefins, particularly polyethylene, by reaction (grafting) of the polyolefin with an unsaturated hydrolysable silane at a temperature above 140° C., in the presence of a compound capable of generating free radical sites in the polyolefin. Subsequent exposure of the reaction product to moisture and a silanol condensation catalyst effects crosslinking. This process has been extensively used commercially for crosslinking polyethylene. EP-B-809672, EP1942131, EP0276790, WO2007/14687, GB2134530, U.S. Pat. No. 6,864,323 and U.S. Pat. No. 7,041,744 are further examples of patents describing such grafting and crosslinking process. U.S. Pat. No. 6,177,519, U.S. Pat. No. 6,590,036, U.S. Pat. No. 6,380,316, U.S. Pat. No. 5,373,059, U.S. Pat. No. 5,929,127, U.S. Pat. No. 6,590,039 and WO2009/073274 all describe grafting other polyolefins and olefin copolymers with an unsaturated hydrolysable silane.

US-A-2005/0287300 describes organopolysiloxanes having acrylic or methacrylic ester groups attached pendently via SiOC groups as additives for radiation curing coatings.

EP 1022302 describes a catalyst system for reacting a silanol group with an alkoxysilane containing a polymerizable ethylenically unsaturated group. The catalyst system includes an organo-lithium reagent and a hydroxylamine.

EP 0581150 describes a releasing agent obtained by reacting of an organic polysiloxane having a hydroxyl group or an epoxy group with an ethylenically unsaturated dicarboxylic acid grafted polyolefin or a reaction product of said grafted polyolefin and an active hydrogen atom-containing compound selected from the group consisting of an alcohol, an amine and an aminoalcohol.

A process according to the present invention for grafting silicone onto a polyolefin comprises reacting the polyolefin with a silicon compound containing an unsaturated group in the presence of means capable of generating free radical sites in the polyolefin, characterized in that the silicon compound is a polyorganosiloxane in which at least 50 mole % of the siloxane units are D units as herein defined, and which contains at least one unsaturated group of the formula —X—CH═CH—R" (I) or —X—C≡C—R" (II), in which X represents a divalent organic linkage having an electron withdrawing effect with respect to the —CH═CH— or —C≡C— bond and/or containing an aromatic ring or a further olefinic double bond or acetylenic unsaturation, the aromatic ring or the further olefinic double bond or acetylenic unsaturation being conjugated with the olefinic unsaturation of —X—CH═CH—R" or with the acetylenic unsaturation of —X—C≡C—R" and R" represents hydrogen or a group having an electron withdrawing effect or any other activation effect with respect to the —CH═CH— or —C≡C— bond.

The invention also includes a composition comprising a polyolefin and a polyorganosiloxane in which at least 50 mole % of the siloxane units are D units as herein defined, and which contains at least one unsaturated group of the formula —X—CH═CH—R" (I) or —X—C≡C—R" (II), in which X represents a divalent organic linkage having an electron withdrawing effect with respect to the —CH═CH— or —C≡C— bond and/or containing an aromatic ring or a further olefinic double bond or acetylenic unsaturation, the aromatic ring or the further olefinic double bond or acetylenic unsaturation being conjugated with the olefinic unsaturation of —X—CH═CH—R" or with the acetylenic unsaturation of —X—C≡C—R" and R" represents hydrogen or a group having an electron withdrawing effect or any other activation effect with respect to the —CH═CH— or —C≡C— bond.

According to another aspect the invention comprises a polyorganosiloxane in which at least 50 mole % of the siloxane units are D units as herein defined and which contains at least one unsaturated group, characterized in that the unsaturated group is group of the formula —X—CH═CH—R" (I) or —X—C≡C—R" (II), in which X represents a divalent organic linkage containing an aromatic ring or a further olefinic double bond or acetylenic unsaturation, the aromatic ring or the further olefinic double bond or acetylenic unsaturation being conjugated with the olefinic unsaturation of —X—CH═CH—R" or with the acetylenic unsaturation of —X—C≡C—R" and R" represents hydrogen or a group having an electron withdrawing effect or any other activation effect with respect to the —CH═CH— or —C≡C— bond.

According to another aspect the invention comprises a polyorganosiloxane in which at least 50 mole % of the siloxane units are D units as herein defined and which contains at least one unsaturated group, characterized in that the unsaturated group is group of the formula —X—CH═CH—R" (I) or —X—C≡C—R" (II), in which X represents a divalent organic linkage having an electron withdrawing effect with respect to the —CH═CH— or —C≡C— bond and/or containing an aromatic ring or a further olefinic double bond or acetylenic unsaturation, the aromatic ring or the further olefinic double bond or acetylenic unsaturation being conjugated with the olefinic unsaturation of —X—CH═CH—R" or with the acetylenic unsaturation of —X—C≡C—R" and bonded to the polyorganosiloxane by a C—Si bond, and R" represents hydrogen or a group having an electron withdrawing effect or any other activation effect with respect to the —CH═CH— or —C≡C— bond.

The invention includes a process for the preparation of a polyorganosiloxane in which at least 50 mole % of the siloxane units are D units as herein defined and which contains at least one unsaturated group, characterized in that the unsaturated group is group of the formula —X—CH═CH—R" (I) or —X—C≡C—R" (II), in which X represents a divalent organic linkage having an electron withdrawing effect with respect to the —CH═CH— or —C≡C— bond and/or containing an aromatic ring or a further olefinic double bond or acetylenic unsaturation, the aromatic ring or the further olefinic double bond or acetylenic unsaturation being conjugated with the olefinic unsaturation of —X—CH═CH—R" or with the acetylenic unsaturation of —X—C≡C—R" and bonded to the polyorganosiloxane by a C—Si bond, and R" represents hydrogen or a group having an electron withdrawing effect or any other activation effect with respect to the —CH═CH— or —C≡C— bond, in which process a polyorganosiloxane in which at least 50 mole % of the siloxane units are D units as herein defined and which contains at least one Si—OH group is reacted with an alkoxysilane containing an unsaturated group of the formula —X—CH═CH—R" (I) or —X—C≡C—R" (II).

The invention further includes a stabilised polymer blend comprising a polyolefin and a polyorganosiloxane in which at least 50 mole % of the siloxane units are D units as herein defined, the polyorganosiloxane being at least partly grafted to the polyolefin by bonds formed by free radical polymerization of unsaturated groups of the formula —X—CH═CH—R" (I) or —X—C≡C—R" (II) in the polyorganosiloxane, in which X represents a divalent organic linkage having an electron withdrawing effect with respect to the —CH═CH— or —C≡C— bond and/or containing an aromatic ring or a further olefinic double bond or acetylenic unsaturation, the aromatic ring or the further olefinic double bond or acetylenic unsaturation being conjugated with the olefinic unsaturation of —X—CH═CH—R" or with the acetylenic unsaturation of —X—C≡C—R" and R" represents hydrogen or a group having an electron withdrawing effect or any other activation effect with respect to the —CH═CH— or —C≡C— bond.

We have found that a polyorganosiloxane containing unsaturated groups of the formula —X—CH═CH—R" (I) or —X—C≡C—R" (II), in which X represents a divalent organic linkage having an electron withdrawing effect with respect to the —CH═CH— or —C≡C— bond, grafts readily to a polyolefin in the presence of means capable of generating free radical sites in the polyolefin, giving enhanced grafting. The enhanced grafting forms a polymer blend in which a higher proportion of the polyorganosiloxane is grafted to the polyolefin. Such a blend has enhanced stability and mechanical properties.

An electron-withdrawing moiety is a chemical group which draws electrons away from a reaction centre. The electron-withdrawing linkage X can in general be any of the groups listed as dienophiles in Michael B. Smith and Jerry March; March's Advanced Organic Chemistry, 5$^{th}$ edition, John Wiley & Sons, New York 2001, at Chapter 15-58 (page 1062). The linkage X can be especially a C(═O)R*, C(═O)OR*, OC(═O)R*, C(═O)Ar linkage in which Ar represents arylene and R* represents a divalent hydrocarbon moiety. X can also be a C(═O)—NH—R* linkage. The electron withdrawing carboxyl, carbonyl, or amide linkage represented by C(═O)R*, C(═O)OR*, OC(═O)R*, C(═O)Ar or C(═O)—NH—R* can be bonded to the linear organopolysiloxane by a divalent organic spacer linkage comprising at least one carbon atom separating the C(═O) R*, C(═O)OR*, OC(═O)R*, C(═O)Ar or C(═O)—NH—R* linkage X from the Si atom.

Electron-donating groups, for example alcohol group or amino group may decrease the electron withdrawing effect. In one embodiment, the polyorganosiloxane is free of such group. Steric effects for example steric hindrance of a terminal alkyl group such as methyl, may affect the reactivity of the olefinic or acetylenic bond. In one embodiment, the polyorganosiloxane is free of such sterically hindering group. Groups enhancing the stability of the radical formed during the grafting reaction, for example double bond or aromatic group conjugated with the unsaturation of the group —X—CH═CH—R" (I) or —X—C≡C—R" (II) are preferably present in (I) or (II). The latter groups have an activation effect with respect to the —CH═CH— or —C≡C— bond.

Silane grafting, for example as described in the above listed patents is efficient to functionalize and crosslink polyethylenes. However when trying to functionalize polypropylene by grafting in the presence of means capable of generating free radical sites in the polyolefin, the grafting is accompanied by degradation of the polymer by chain scission in the β-position or so-called β-scission. We have found that a polyorganosiloxane containing at least one group of the formula —X—CH═CH—R" (I) or —X—C≡C—R" (II), in which X represents a divalent organic linkage containing an aromatic ring or a further olefinic double bond or acetylenic unsaturation, the aromatic ring or the further olefinic double bond or acetylenic unsaturation being conjugated with the olefinic unsaturation of —X—CH═CH—R" or with the acetylenic unsaturation of —X—C≡C—R", grafts efficiently to polypropylene, and to other polyolefins comprising at least 50% by weight units of an alpha-olefin having 3 to 8 carbon atoms, with minimised degradation by β-scission.

A polyorganosiloxane containing at least one group of the formula —X—CH═CH—R" (I) or —X—C≡C—R" (II), in which X represents a divalent organic linkage having an electron withdrawing effect with respect to the —CH═CH— or —C≡C— bond, but not containing an aromatic ring or a further olefinic double bond or acetylenic unsaturation, can be grafted efficiently to polypropylene, and to other polyolefins comprising at least 50% by weight units of an alpha-olefin having 3 to 8 carbon atoms, if the polyorganosiloxane is combined with an appropriate co-agent as described below.

Organopolysiloxanes, also known as silicones, generally comprise siloxane units selected from $R_3SiO_{1/2}$ (M units), $R_2SiO_{2/2}$ (D units), $RSiO_{3/2}$ (T units) and $SiO_{4/2}$ (Q units), in which each R represents an organic group or hydrogen or a hydroxyl group. The polyorganosiloxanes of the present invention are organopolysiloxanes in which at least 50 mole % of the siloxane units are D units. In one embodiment, the polyorganosiloxane is a substantially linear polydiorganosiloxane comprising a chain of D units, with terminal M units and T and for Q branching units being absent or only present in minor amounts. The polyorganosiloxane can alternatively be branched, that is it can contain T and for Q branching units as well as D units and M units, provided that at least 50 mole % of the siloxane units are D units.

The polyorganosiloxane can in general contain any number of siloxane units from two upwards, for example it can contain 2 to 10000 siloxane units, preferably 10 to 2000 siloxane units.

The D units in the polyorganosiloxane can in general be selected from any —$R_2SiO$— units in which each R, which can be the same or different, can represent any monovalent organic group, for example an alkyl group having 1 to 18 carbon atoms, a substituted alkyl group having 1 to 18 carbon atoms such as a hydroxyalkyl or aminoalkyl group, or an aryl or aralkyl group. Preferably each R represents an alkyl group having 1 to 4 carbon atoms or a phenyl group, for example the —$R_2SiO$— units can be dimethylsiloxane units optionally together with methylphenylsiloxane units. The polyorganosiloxane can for example be a polydimethylsiloxane (PDMS) containing groups of the formula —X—CH=CH—R" (I) or —X—C≡C—R" (II).

Examples of groups of the formula —X—CH=CH—R" (I) in which X represents a divalent organic linkage having an electron withdrawing effect with respect to the —CH=CH— bond include acryloxy groups such as 3-acryloxypropyl or acryloxymethyl. We have found that polyorganosiloxanes containing acryloxyalkyl groups graft to polyolefins more readily than polyorganosiloxanes containing methacryloxyalkyl groups.

By an aromatic ring we mean any cyclic moiety which is unsaturated and which shows some aromatic character or π-bonding. The aromatic ring can be a carbocyclic ring such as a benzene or cyclopentadiene ring or a heterocyclic ring such as a furan, thiophene, pyrrole or pyridine ring, and can be a single ring or a fused ring system such as a naphthalene, quinoline or indole moiety. Examples of groups of the formula —X—CH=CH—R" (I) or —X—C≡C—R" (II) in which X represents a divalent organic linkage containing an aromatic ring or a further olefinic double bond or acetylenic unsaturation, the aromatic ring or the further olefinic double bond or acetylenic unsaturation being conjugated with the olefinic unsaturation of —X—CH=CH—R" or with the acetylenic unsaturation of —X—C≡C—R" include those of the formula $CH_2$=CH—$C_6H_4$-A- or CH≡C—$C_6H_4$-A-, wherein A represents a direct bond or a spacer group. The group —X—CH=CH—R" (I) can for example be styryl (C6H5CH=CH— or —C6H4CH=CH2), styrylmethyl, 2-styrylethyl or 3-styrylpropyl. The spacer group A can optionally comprise a heteroatom linking group particularly an oxygen, sulfur or nitrogen heteroatom, for example the group —X—CH=CH—R" (I) can be vinylphenylmethylthiopropyl.

Examples of groups of the formula —X—CH=CH—R" (I) in which X represents a divalent organic linkage having an electron withdrawing effect with respect to the —CH=CH— bond and also containing an aromatic ring or a further olefinic double bond or acetylenic unsaturation, the aromatic ring or the further olefinic double bond or acetylenic unsaturation being conjugated with the olefinic unsaturation of —X—CH=CH—R" or with the acetylenic unsaturation of —X—C≡C—R" include sorbyloxyalkyl groups such as sorbyloxypropyl $CH_3$—CH=CH—CH=CH—C(=O)O—$(CH_2)_3$—, cinnamyloxyalkyl groups such as cinnamyloxypropyl, and 3-(2-furyl)acryloxyalkyl groups such as 3-(2-furyl)acryloxypropyl.

In a preferred embodiment, the composition contains, in addition to the polyorganosiloxane and polyolefin, an unsaturated silane, having at least one hydrolysable group bonded to Si, or a hydrolysate thereof, characterized in that the silane has the formula R"—CH=CH—Z (I) or R"—C≡C—Z (II) in which Z represents an electron-withdrawing moiety substituted by a —$SiR_aR'_{(3-a)}$ group wherein R represents a hydrolysable group; R' represents a hydrocarbyl group having 1 to 6 carbon atoms; a has a value in the range 1 to 3 inclusive; and R" represents hydrogen or a group having an electron withdrawing effect or any other activation effect with respect to the —CH=CH— or —C≡C— bond. Such unsaturated silanes are described in WO2010/000478.

The groups of the formula —X—CH=CH—R" (I) or —X—C≡C—R" (II) can be introduced into the polyorganosiloxane by a variety of techniques. In one preferred method, a polyorganosiloxane containing at least one Si—OH group is reacted with an alkoxysilane containing a group of the formula —X—CH=CH—R" (I) or —X—C≡C—R" (II). The alkoxysilane can be a trialkoxysilane of the formula $(R'O)_3Si$—X—CH=CH—R" or $(R'O)_3Si$—X—C≡C—R", in which X and R" have the meanings above and R' represents an alkyl group, preferably methyl or ethyl, but can alternatively be a monoalkoxysilane of the formula $(R'O)R^*_2Si$—X—CH=CH—R" or $(R'O)R^*_2Si$—X—C≡C—R" or a dialkoxysilane of the formula $(R'O)_2R^*Si$—X—CH=CH—R" or $(R'O)_2R^*Si$—X—C≡C—R". The alkoxysilane condenses with the Si—OH group to replace the Si—OH group by a Si—O—Si—X—CH=CH—R" or Si—O—Si—X—C≡C—R" group. Condensation is catalysed by acids or bases. A strong acid catalyst such as trifluoromethanesulfonic acid or hydrochloric acid is preferred.

3-acryloxypropyl or acryloxymethyl groups can be introduced into the polyorganosiloxane by reaction of 3-acryloxypropyltrimethoxysilane or acryloxymethyltrimethoxysilane. 3-acryloxypropyltrimethoxysilane can be prepared from allyl acrylate and trimethoxysilane by the process described in U.S. Pat. No. 3,179,612. Acryloxymethyltrimethoxysilane can be prepared from acrylic acid and chloromethyltrimethoxysilane by the process described in U.S. Pat. No. 3,179,612.

Styryl, styrylmethyl, 2-styrylethyl or 3-styrylpropyl groups can be introduced into the polyorganosiloxane by reaction of for example 4-(trimethoxysilyl)styrene or styrylethyl trimethoxysilane. 4-(trimethoxysilyl)styrene can be prepared via the Grignard reaction of 4-bromo- and/or 4-chlorostyrene with tetramethoxysilane in the presence of magnesium as described in EP-B-1318153. Styrylethyltrimethoxysilane is e.g. commercially available from Gelest, Inc as a mixture of meta and para, as well as alpha, and beta isomers.

Sorbyloxyalkyl groups such as $CH_3$—CH=CH—CH=CH—C(=O)O—$(CH_2)_3$—(sorbyloxypropyl) can be introduced into the polyorganosiloxane by condensation of a trialkoxysilane such as

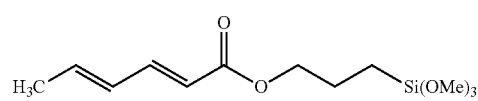

Cinnamyloxyalkyl groups such as cinnamyloxypropyl can be derived from condensation of a trialkoxysilane such as

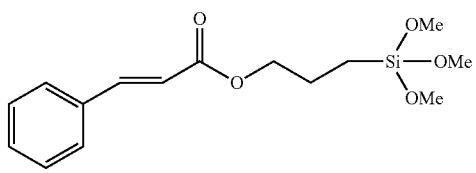 [SMILES: CO[Si](CCCOC(=O)/C=C/c1ccccc1)(OC)OC]

whose preparation is described in U.S. Pat. No. 3,179,612. 3-(2-furyl)acryloxyalkyl groups such as 3-(2-furyl)acryloxypropyl can be derived from condensation of a trialkoxysilane such as

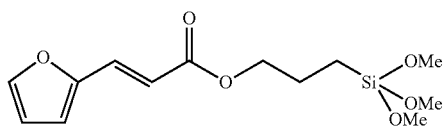 [SMILES: CO[Si](CCCOC(=O)/C=C/c1ccco1)(OC)OC]

In general, all unsaturated silanes which are silylalkyl esters of an unsaturated acid can be prepared from the unsaturated acid, for example acrylic, maleic, fumaric, sorbic or cinnamic acid, propynoic or butyne-dioic acid, by reaction of the corresponding carboxylate salt with the corresponding chloroalkylalkoxysilane. In a first step, the alkali salt of the carboxylic acid is formed either by reaction of the carboxylic acid with alkali alkoxide in alcohol, as described e.g. in U.S. Pat. No. 4,946,977, or by reaction of the carboxylic acid with aqueous base and subsequent removal of the water via azeotropic distillation, as described e.g. in WO-2005/103061. A trialkyl ammonium salt of the carboxylic acid can be formed by direct reaction of the free carboxylic acid with trialkyl amine, preferentially tributyl amine or triethyl amine as described in U.S. Pat. No. 3,258,477 or U.S. Pat. No. 3,179,612. In a second step the carboxylic acid salt is then reacted via nucleophilic substitution reaction with the chloroalkylalkoxysilane under formation of the alkali chloride or trialkylammonium chloride as a by-product. This reaction can be performed with the chloroalkylalkoxysilane under neat condition or in solvents such as benzene, toluene, xylene, or a similar aromatic solvent, as well as methanol, ethanol, or another alcohol-type solvent. It is preferable to have a reaction temperature within the range of 30 to 180° C., preferably within the range of 100 to 160° C. In order to speed up this replacement reaction, phase transfer catalysts of various kinds can be used. Preferable phase transfer catalysts are the following: tetrabutylammonium bromide (TBAB), trioctylmethylammonium chloride, Aliquat® 336 (Cognis GmbH) or similar quaternary ammonium salts (as e.g. used in U.S. Pat. No. 4,946,977), tributylphosphonium chloride (as e.g. used in U.S. Pat. No. 6,841,694), guanidinium salts (as e.g. used in EP0900801) or cyclic unsaturated amines as 1,8-diazabicyclo[5.4.0]undeca-7-ene (DBU, as e.g. used in WO2005/103061). If necessary, the following polymerization inhibitors can be used throughout preparation and/or purification steps: hydroquinones, phenol compounds such as methoxyphenol and 2,6-di-t-butyl 4-methylphenol, phenothiazine, p-nitrosophenol, amine-type compounds such as e.g. N,N'-diphenyl-p-phenylenediamine or sulfur containing compounds as described in but not limited to the patents cited above.

The polyorganosiloxane containing Si—OH groups which is reacted with the alkoxysilane containing a —X—CH=CH—R" (I) or —X—C≡C—R" (II) group can have its Si—OH group or groups as terminal groups to the polymer chain, reacting to form a polyorganosiloxane with terminal Si—O—Si—X—CH=CH—R" or Si—O—Si—X—C≡C—R" groups. The polyorganosiloxane may have a single terminal Si—OH group, or may be a linear polydiorganosiloxane having terminal Si—OH groups at both ends of the polydiorganosiloxane molecule, or may be a branched polyorganosiloxane having more than two terminal Si—OH groups. Alternatively or additionally, the polyorganosiloxane containing Si—OH groups can have its Si—OH group or groups as non-terminal groups along the polymer chain, reacting with the alkoxysilane containing a —X—CH=CH—R" (I) or —X—C≡C—R" (II) group to form pendant —O—Si—X—CH=CH—R" or —O—Si—X—C≡C—R" groups.

In an alternative process for preparing the polyorganosiloxane containing —X—CH=CH—R" (I) or —X—C≡C—R" (II) groups, a polyorganosiloxane containing Si—H groups is reacted with an alcohol of the formula HO—X—CH=CH—R" or HO—X—C≡C—R", using a Lewis acid catalyst or a catalyst composed of a carboxylic acid and salts of carboxylic acids, as described in US-A-2005/0287300. The Si—H groups are converted to Si—O—X—CH=CH—R" or Si—O—X—C≡C—R" groups. A polyorganosiloxane having terminal Si—H groups will form terminal Si—O—X—CH=CH—R" or Si—O—X—C≡C—R" groups. A polyorganosiloxane containing Si—H groups along the polysiloxane chain will produce pendant Si—O—X—CH=CH—R" or Si—O—X—C≡C—R" groups along the polymer chain.

A polyorganosiloxane containing —X—CH=CH—R" (I) or —X—C≡C—R" (II) groups formed by the reaction of a polyorganosiloxane containing Si—OH groups with an alkoxysilane containing a —X—CH=CH—R" (I) or —X—C≡C—R" (II) group may be preferred because its —X—CH=CH—R" (I) and —X—C≡C—R" (II) groups are bonded to the polyorganosiloxane by a C—Si bond. C—Si bonds and Si—O—Si bonds are hydrolytically more stable than Si—O—C bonds.

For some uses it may be preferred that the polyorganosiloxane contains hydrolysable groups, so that the grafted product can be further crosslinked in the presence of water by hydrolysis and condensation of the hydrolysable groups. Preferred hydrolysable groups are Si-bonded alkoxy groups, particularly Si—OR' groups in which R' represents an alkyl group having 1 to 4 carbon atoms. Such Si—OR' groups can conveniently be introduced into the polyorganosiloxane by reacting a polyorganosiloxane containing at least one Si—OH group with a trialkoxysilane of the formula (R'O)$_3$Si—X—CH=CH—R" or (R'O)$_3$Si—X—C≡C—R", in which X, R' and R" have the meanings above.

The polyolefin can for example be a polymer of an olefin having 2 to 10 carbon atoms, particularly of an alpha olefin of the formula $CH_2$=CHQ where Q is a hydrogen or a linear or branched alkyl group having 1 to 8 carbon atoms, and is in general a polymer containing at least 50 mole % units of an olefin having 2 to 10 carbon atoms.

The polyolefin can for example be a polymer of ethene (ethylene), propene (propylene), butene or 2-methyl-propene-1 (isobutylene), hexene, heptene, octene, styrene. Propylene and ethylene polymers are an important class of polymers, particularly polypropylene and polyethylene. Polypropylene is a commodity polymer which is broadly available and of low cost. It has low density and is easily processed and versatile. Most commercially available polypropylene is isotactic polypropylene, but the process of the invention is applicable to atactic and syndiotactic polypropylene as well as to isotactic polypropylene. Isotactic polypropylene is prepared for example by polymerization of propene using a Ziegler-Natta catalyst or a metallocene catalyst. The polyethylene can for example be high density polyethylene of density 0.955 to 0.97 g/cm$^3$, medium density polyethylene (MDPE) of density 0.935 to 0.955 g/cm$^3$ or low density polyethylene (LDPE) of density 0.918 to 0.935 g/cm$^3$ including ultra low density polyethylene, high pressure low density polyethylene and low pressure low density polyethylene, or microporous polyethylene. The polyethylene can for example be produced using a Ziegler-Natta catalyst, a chromium catalyst or a metallocene catalyst. The polyolefin can alternatively be a polymer of a diene, such as a diene having 4 to 18 carbon atoms and at least one terminal double bond, for example butadiene or isoprene. The polyolefin can be a copolymer or terpolymer, for example a copolymer of propylene with ethylene or a copolymer of propylene or ethylene with an alpha-olefin having 4 to 18 carbon atoms, or of ethylene or propylene with an acrylic monomer such as acrylic acid, methacrylic acid, acrylonitrile, methacrylonitrile or an ester of acrylic or methacrylic acid and an alkyl or substituted alkyl group having 1 to 16 carbon atoms, for example ethyl acrylate, methyl acrylate or butyl acrylate, or a copolymer with vinyl acetate. The polyolefin can be a terpolymer for example a propylene ethylene diene terpolymer. Alternatively, the polyolefin can be a diene polymer such as polybutadiene, polyisoprene or a copolymer of butadiene with styrene, or a terpolymer of butadiene with ethylene and styrene or with acrylonitrile and styrene. The polyolefin can be heterophasic, for example a propylene ethylene block copolymer.

Grafting of the polyorganosiloxane to the polyolefin to an extent that improves the stability and/or physical properties of the blend produced, generally requires means capable of generating free radical sites in the polyolefin. The means for generating free radical sites in the polyolefin preferably comprises a compound capable of generating free radicals, and thus capable of generating free radical sites in the polyolefin. Other means include applying shear, heat or irradiation such as electron beam radiation. The high temperature and high shear rate generated by a melt extrusion process can generate free radical sites in the polyolefin.

The compound capable of generating free radical sites in the polyolefin is preferably an organic peroxide, although other free radical initiators such as azo compounds can be used. Preferably the radical formed by the decomposition of the free-radical initiator is an oxygen-based free radical. It is more preferable to use hydroperoxides, carboxylic peroxyesters, peroxyketals, dialkyl peroxides and diacyl peroxides, ketone peroxides, diaryl peroxides, aryl-alkyl peroxides, peroxydi carbonates, peroxyacids, acyl alkyl sulfonyl peroxides and monoperoxydicarbonates. Examples of preferred peroxides include dicumyl peroxide, 2,5-dimethyl-2,5-di-(tert-butylperoxy)hexane, di-tert-butyl peroxide, 2,5-dimethyl-2,5-di-(tert-butylperoxy)hexyne-3,3,6,9-triethyl-3,6,9-trimethyl-1,4,7-triperoxonane, benzoyl peroxide, 2,4-dichlorobenzoyl peroxide, tert-butyl peroxyacetate, tert-butyl peroxybenzoate, tert-amylperoxy-2-ethylhexyl carbonate, tert-butylperoxy-3,5,5-trimethylhexanoate, 2,2-di(tert-butylperoxy)butane, tert-butylperoxy isopropyl carbonate, tert-buylperoxy-2-ethylhexyl carbonate, butyl 4,4-di(tert-buylperoxy)valerate, di-tert-amyl peroxide, tert-butyl peroxy pivalate, tert-butyl-peroxy-2-ethyl hexanoate, di(tertbutylperoxy)cyclohexane, tertbutylperoxy-3,5,5-trimethylhexanoate, di(tertbutylperoxyisopropyl)benzene, cumene hydroperoxide, tert-butyl peroctoate, methyl ethyl ketone peroxide, tert-butyl a-cumyl peroxide, 2,5-dimethyl-2,5-di(peroxybenzoate)hexyne-3,1,3- or 1,4-bis(t-butylperoxyisopropyl)benzene, lauroyl peroxide, tert-butyl peracetate, and tert-butyl perbenzoate. Examples of azo compounds are azobisisobutyronitrile and dimethylazodiisobutyrate. The above radical initiators can be used alone or in combination of at least two of them.

The temperature at which the polyolefin and the polyorganosiloxane are reacted in the presence of the compound capable of generating free radical sites in the polyolefin is generally above 120° C., usually above 140° C., and is sufficiently high to melt the polyolefin and to decompose the free radical initiator. For polypropylene and polyethylene, a temperature in the range 170° C. to 220° C. is usually preferred. The peroxide or other compound capable of generating free radical sites in the polyolefin preferably has a decomposition temperature in a range between 120-220° C., most preferably between 160-190° C. In one preferred procedure, the polyolefin, the polyorganosiloxane, the compound capable of generating free radical sites in the polyolefin and a vinyl aromatic co-agent if required are mixed together at above 120° C. in a twin screw extruder to graft the polyorganosiloxane to the polymer.

The compound capable of generating free radical sites in the polyolefin is generally present in an amount of at least 0.01% by weight of the total composition and can be present in an amount of up to 5 or 10%. An organic peroxide, for example, is preferably present at 0.01 to 2% by weight based on the polyolefin during the grafting reaction. Most preferably, the organic peroxide is present at 0.01% to 0.5% by weight of the total composition.

The means for generating free radical sites in the polyolefin can alternatively be an electron beam. If electron beam is used, there is no need for a compound such as a peroxide capable of generating free radicals. The polyolefin is irradiated with an electron beam having an energy of at least 5 MeV in the presence of the unsaturated silane (I) or (II). Preferably, the accelerating potential or energy of the electron beam is between 5 MeV and 100 MeV, more preferably from 10 to 25 MeV. The power of the electron beam generator is preferably from 50 to 500 kW, more preferably from 120 to 250 kW. The radiation dose to which the polyolefin/grafting agent mixture is subjected is preferably from 0.5 to 10 Mrad. A mixture of polyolefin and the branched silicone resin can be deposited onto a continuously moving conveyor such as an endless belt, which passes under an electron beam generator which irradiates the mixture. The conveyor speed is adjusted in order to achieve the desired irradiation dose.

Polyethylene and polymers consisting mainly of ethylene units do not usually degrade when free radical sites are generated in the polyethylene. Efficient grafting can be achieved with a polyorganosiloxane containing at least one group of the formula —X—CH═CH—R" (I) or —X—C≡C—R" (II), in which X represents a divalent organic linkage having an electron withdrawing effect with respect to the —CH═CH— or —C≡C— bond whether or not X contains an aromatic ring or a further olefinic double bond or acetylenic unsaturation, the aromatic ring or the further olefinic double bond or acetylenic unsaturation being conjugated with the olefinic unsaturation of —X—CH═CH—R" or with the acetylenic unsaturation of —X—C≡C—R".

If the polyolefin comprises at least 50% by weight units of an olefin having 3 to 8 carbon atoms, for example when polypropylene constitutes the major part of the thermoplastic resin, β-scission may occur if X does not contain an aromatic ring or a further olefinic double bond or acetylenic unsaturation conjugated with the olefinic unsaturation of —X—CH=CH—R" or with the acetylenic unsaturation of —X—C≡C—R". In this case, for example if —X—CH=CH—R" is an acryloxyalkyl group, grafting reaction is preferably carried out in the presence of a co-agent which inhibits polymer degradation by beta scission.

The co-agent which inhibits polymer degradation is preferably a compound containing an aromatic ring conjugated with an olefinic —C=C— or acetylenic —C≡C— unsaturated bond. By an aromatic ring we mean any cyclic moiety which is unsaturated and which shows some aromatic character or π-bonding. The aromatic ring can be a carbocyclic ring such as a benzene or cyclopentadiene ring or a heterocyclic ring such as a furan, thiophene, pyrrole or pyridine ring, and can be a single ring or a fused ring system such as a naphthalene, quinoline or indole moiety. Most preferably the co-agent is a vinyl or acetylenic aromatic compound such as styrene, alpha-methylstyrene, beta-methyl styrene, vinyltoluene, vinyl-pyridine, 2,4-biphenyl-4-methyl-1-pentene, phenylacetylene, 2,4-di(3-isopropylphenyl)-4-methyl-1-pentene, 2,4-di(4-isopropylphenyl)-4-methyl-1-pentene, 2,4-di(3-methylphenyl)-4-methyl-1-pentene, 2,4-di(4-methylphenyl)-4-methyl-1-pentene, and may contain more than one vinyl group, for example divinylbenzene, o-, m- or p-diisopropylbenzene, 1,2,4- or 1,3,5-triisopropylbenzene, 5-isopropyl-m-diisopropylbenzene, 2-isopropyl-p-diisopropylbenzene, and may contain more than one aromatic ring, for example trans- and cis-stilbene, 1,1-diphenylethylene, or 1,2-diphenylacetylene, diphenyl imidazole, diphenylfulvene, 1,4-diphenyl-1,3-butadiene, 1,6-diphenyl-1,3,5-hexatriene, dicinnamalacetone, phenylindenone. The co-agent can alternatively be a furan derivative such as 2-vinylfuran. A preferred co-agent is styrene.

The co-agent which inhibits polymer degradation can alternatively be a compound containing an olefinic —C=C— or acetylenic —C≡C— conjugated with an olefinic —C=C— or acetylenic —C≡C— unsaturated bond. For example a sorbate ester, or a 2,4-pentadienoates, or a cyclic derivative thereof. A preferred co agent is ethylsorbate of the formula:

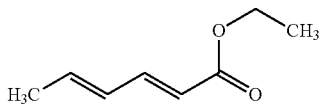

The co-agent which inhibits polymer degradation can alternatively be a multi-functional acrylate, such as e.g., trimethylolpropane triacrylate, pentaerythritol tetracrylate, pentaerythriol triacrylate, diethyleneglycol diacrylate, dipropylenglycol diacrylate or ethylene glycol dimethacrylate, or lauryl and stearylacrylates.

The co-agent which inhibits polymer degradation is preferably added with the polyorganosiloxane and the compound such as a peroxide capable of generating free radical sites in the polyolefin. The co-agent, for example a vinyl aromatic compound such as styrene, is preferably present at 0.1 to 15.0% by weight of the total composition.

If the polyorganosiloxane contains at least one group of the formula —X—CH=CH—R" (I) or —X—C≡C—R" (II), in which X represents a divalent organic linkage containing an aromatic ring or a further olefinic double bond or acetylenic unsaturation, the aromatic ring or the further olefinic double bond or acetylenic unsaturation being conjugated with the olefinic unsaturation of —X—CH=CH—R" or with the acetylenic unsaturation of —X—C≡C—R", efficient grafting can be achieved without substantial β-scission even if the polyolefin comprises at least 50% by weight units of an olefin having 3 to 8 carbon atoms.

If the polyorganosiloxane contains hydrolysable groups, for example silyl-alkoxy groups, these can react in the presence of moisture with hydroxyl groups present on the surface of many fillers and substrates, for example of minerals and natural products. The compositions of the invention can contain one or more organic or inorganic fillers and/or fibres. The moisture can be ambient moisture or a hydrated salt can be added. Grafting of the polyolefin with a polyorganosiloxane containing hydrolysable groups according to the invention forms a polyolefin polyorganosiloxane blend having improved compatibility with fillers and fibrous reinforcements and can thus form filled polyolefin polyorganosiloxane blends of improved properties. Such improved properties can for example be improved physical properties derived from reinforcing fillers or fibres, or other properties derived from the filler such as improved coloration by pigments.

In one process according to the invention the polyorganosiloxane containing at least one group of the formula —X—CH=CH—R" (I) or —X—C≡C—R" (II) is deposited on a filler before being reacted with the polyolefin. Alternatively the fillers and/or fibres can conveniently be mixed into the polyolefin with the organopolysiloxane and the organic peroxide during the grafting reaction, or can be mixed with the grafted polymer blend subsequently.

When forming a filled polymer composition, the grafted polymer can be the only polymer in the composition or the polyolefin grafted with a polyorganosiloxane containing hydrolysable groups can be used as a coupling agent improving filler/polymer adhesion; for example polypropylene grafted according to the invention can be used as a coupling agent for unmodified polypropylene in filled compositions. The grafted polymer can thus be from 1 or 10% by weight up to 100% of the polymer content of the filled composition. Moisture and optionally silanol condensation catalyst can be added to the composition to promote bonding between filler and grafted polymer. Preferably the grafted polymer can be from 2% up to 10% of the total weight of the filled polymer composition. The hydrolysable groups can also react with each other in the presence of moisture to form Si—O—Si linkages between polymer chains.

Examples of mineral fillers or pigments which can be incorporated in the grafted polymer include titanium dioxide, aluminium trihydroxide, magnesium dihydroxide, mica, kaolin, calcium carbonate, non-hydrated, partially hydrated, or hydrated fluorides, chlorides, bromides, iodides, chromates, carbonates, hydroxides, phosphates, hydrogen phosphates, nitrates, oxides, and sulphates of sodium, potassium, magnesium, calcium, and barium; zinc oxide, aluminium oxide, antimony pentoxide, antimony trioxide, beryllium oxide, chromium oxide, iron oxide, lithopone, boric acid or a borate salt such as zinc borate, barium metaborate or aluminium borate, mixed metal oxides such as aluminosilicate, vermiculite, silica including fumed silica, fused silica, precipitated silica, quartz, sand, and silica gel; rice hull ash, ceramic and glass beads, zeolites, metals such as aluminium flakes or powder, bronze powder, copper, gold, molybdenum, nickel, silver powder or flakes, stainless steel powder, tungsten, hydrous calcium silicate, barium titanate, silica-carbon black composite, functionalized carbon nanotubes, cement, fly ash, slate flour, bentonite, clay, talc, anthracite, apatite, attapulgite, boron nitride, cristobalite, diatomaceous earth, dolomite, ferrite, feldspar, graphite, calcined kaolin, molybdenum disulfide, perlite, pumice, pyrophyllite, sepiolite, zinc stannate, zinc sulfide or wollastonite.

Preferred fillers include reinforcing fillers known to reinforce diorganopolysiloxanes, for example finely divided, heat stable minerals such as fumed and precipitated forms of silica, silica aerogels and titanium dioxide having a specific surface area of at least about 50 m$^2$/g. The fumed form of silica is a preferred reinforcing filler based on its high surface area, which can be up to 700 m$^2$/g, more preferably a fumed silica having a surface area of 50 to 400 m$^2$/g, most preferably 200 to 380 m$^2$/g. Preferably, the fumed silica filler is treated to render its surface hydrophobic, as typically practiced in the silicone rubber art. This can be accomplished by reacting the silica with a liquid organosilicon compound, which contains silanol groups or hydrolyzable precursors of silanol groups.

Examples of fibres which can be incorporated in the grafted polymer include natural fibres such as wood flour, wood fibres, cotton fibres, cellulosic fibres or agricultural fibres such as wheat straw, hemp, flax, kenaf, kapok, jute, ramie, sisal, henequen, corn fibre or coir, or nut shells or rice hulls, or synthetic fibres such as polyester fibres, aramid fibres, nylon fibres, or glass fibres. Examples of organic fillers include lignin, starch or cellulose and cellulose-containing products, or plastic microspheres of polytetrafluoroethylene or polyethylene. The filler can be a solid organic pigment such as those incorporating azo, indigoid, triphenylmethane, anthraquinone, hydroquinone or xanthine dyes.

The concentration of filler or pigment in such filled compositions can vary widely; for example the filler or pigment can form from 1 or 2% up to 70% by weight of the total composition.

The grafted polyolefin of the invention can also be used to improve the compatibility of a low polarity polymer such as polypropylene with a polar polymer. The composition comprising the low polarity polymer, polar polymer and grafted polyolefin can be filled and/or fibre-reinforced or unfilled.

For many uses the grafted polymer preferably contains at least one antioxidant. Examples of suitable antioxidants include tris(2,4-di-tert-butylphenyl)phosphite sold commercially under the trade mark Ciba Irgafos® 168, tetrakis [methylene-3-(3,5-di-tert-butyl-4-hydroxyphenyl-propionate)]methane processing stabilizer sold commercially under the trade mark Ciba Irganox® 1010 and 1.3.5-trimethyl-2.4.6-tris(3.5-di-tert-butyl-4-hydroxy benzyl)benzene sold commercially under the trade mark Ciba Irganox® 1330. It may also be desired that the grafted polymer contains a stabiliser against ultraviolet radiation and light radiation, for example a hindered amine light stabiliser such as a 4-substituted-1,2,2,6,6-pentamethylpiperidine, for example those sold under the trademarks Tinuvin® 770, Tinuvin® 622, Uvasil® 299, Chimassorb® 944 and Chimassorb® 119. The antioxidant and/or hindered amine light stabiliser can conveniently be incorporated in the polyolefin with the unsaturated silane and the organic peroxide during the grafting reaction. The total concentration of antioxidants and light stabilisers in the crosslinked polyolefin is typically in the range 0.02 to 0.15% by weight of the total composition.

The grafted polymer composition of the invention can also contain other additives such as dyes or processing aids.

The grafted polyolefin composition produced according to the invention is a stabilised polymer blend of polyolefin and polyorganosiloxane and can be used in a wide variety of products. The grafted polyolefin composition can be blow moulded or rotomoulded to form bottles, cans or other liquid containers, liquid feeding parts, air ducting parts, tanks, including fuel tanks, corrugated bellows, covers, cases, tubes, pipes, pipe connectors or transport trunks. The grafted polyolefin composition can be blow extruded to form pipes, corrugated pipes, sheets, fibres, plates, coatings, film, including shrink wrap film, profiles, flooring, tubes, conduits or sleeves or extruded onto wire or cable as an electrical insulation layer. The grafted polyolefin composition can be injection moulded to form tube and pipe connectors, packaging, gaskets and panels. The grafted polyolefin composition can also be foamed or thermoformed. If the polyorganosiloxane contains hydrolysable groups, the shaped article can in each case be crosslinked by exposure to moisture in the presence of a silanol condensation catalyst.

Articles formed from the stabilised polymer blend of polyolefin and polyorganosiloxane have enhanced physical/mechanical properties and enhanced heat resistance and flame retardancy compared to articles formed from the same polyolefin without grafting or crosslinking.

The invention provides a composition comprising 5 to 95% by weight of a polyolefin and 95 to 5% by weight of a polyorganosiloxane in which at least 50 mole % of the siloxane units are D units as herein defined and which contains at least one unsaturated group, characterized in that the unsaturated group is group of the formula —X—CH═CH—R" (I) or —X—C≡C—R" (II), in which X represents a divalent organic linkage having an electron withdrawing effect with respect to the —CH═CH— or —C≡C— bond and/or containing an aromatic ring or a further olefinic double bond or acetylenic unsaturation, the aromatic ring or the further olefinic double bond or acetylenic unsaturation being conjugated with the olefinic unsaturation of —X—CH═CH—R" or with the acetylenic unsaturation of —X—C≡C—R" and R" represents hydrogen or a group having an electron withdrawing effect or any other activation effect with respect to the —CH═CH— or —C≡C— bond.

Preferably, the polyorganosiloxane comprises 2 to 2000 siloxane units and at least 90 mole % of the siloxane units are D units.
  Preferably, the polyorganosiloxane is polydimethylsiloxane having at least one terminal group of the formula —X—CH═CH—R" (I) or —X—C≡C—R" (II).
  Preferably, the polyorganosiloxane is a linear polydiorganosiloxane having terminal groups of the formula —X—CH═CH—R" (I) or —X—C≡C—R" (II) at both ends of the polydiorganosiloxane molecule.
  Preferably, the polyorganosiloxane has at least one pendant group of the formula —X—CH═CH—R" (I) or —X—C≡C—R" (II).
  Preferably, the groups of the formula —X—CH═CH—R" (I) or —X—C≡C—R" (II) are bonded to the polyorganosiloxane by a C—Si bond.
  Preferably, the group of the formula —X—CH═CH—R" (I) is an acryloxyalkyl group.
  The invention provides a composition characterized in that the polyolefin comprises at least 50% by weight units of an olefin having 3 to 8 carbon atoms and the composition contains a co-agent which inhibits polyolefin degradation by beta scission in the presence of a compound capable of generating free radical sites in the polyolefin.
  Preferably, the co-agent is a vinyl aromatic compound, preferably styrene, or a sorbate ester, preferably ethyl sorbate.

More preferably, the co-agent is present at 0.1 to 15.0% by weight of the total composition.

Preferably, the group —X—CH=CH—R" (I) or —X—C≡C—R" (II) has the formula CH$_2$=CH—C$_6$H$_4$-A- (III) or CH≡C—C$_6$H$_4$-A- (IV), wherein A represents a direct bond or a divalent organic group having 1 to 12 carbon atoms optionally containing a divalent heteroatom linking group chosen from —O—, —S— and —NH—.

Preferably, the group of the formula —X—CH=CH—R" (I) has the formula R$^2$—CH=CH—CH=CH—X— (V), where R$^2$ represents hydrogen or a hydrocarbyl group having 1 to 12 carbon atoms.

Preferably, the group of the formula —X—CH=CH—R" (I) is a sorbyloxy group.

Preferably, the composition comprises 1 to 99% of a polyolefin and 99 to 1% by weight of a polyorganosiloxane, more preferably 5 to 95% by weight of a polyolefin and 95 to 5% by weight of a polyorganosiloxane.

Preferably, an organic peroxide compound capable of generating free radical sites in the polyolefin is present at 0.01 to 2% by weight of the total composition.

The invention provides a polyorganosiloxane in which at least 50 mole % of the siloxane units are D units as herein defined and which contains at least one unsaturated group, characterized in that the unsaturated group is group of the formula —X—CH=CH—R" (I) or —X—C≡C—R" (II), in which X represents a divalent organic linkage having an electron withdrawing effect with respect to the —CH=CH— or —C≡C— bond and/or containing an aromatic ring or a further olefinic double bond or acetylenic unsaturation, the aromatic ring or the further olefinic double bond or acetylenic unsaturation being conjugated with the olefinic unsaturation of —X—CH=CH—R" or with the acetylenic unsaturation of —X—C≡C—R" and bonded to the polyorganosiloxane by a C—Si bond, and R" represents hydrogen or a group having an electron withdrawing effect or any other activation effect with respect to the —CH=CH— or —C≡C— bond.

The invention preferably provides a process for the preparation of a polyorganosiloxane, characterised in that a polyorganosiloxane in which at least 50 mole % of the siloxane units are D units as herein defined and which contains at least one Si—OH group is reacted with an alkoxysilane containing an unsaturated group of the formula —X—CH=CH—R" (I) or —X—C≡C—R" (II).

Preferably the invention provides a process for grafting silicone onto a polyolefin, comprising reacting the polyolefin with a silicon compound containing an unsaturated group in the presence of means capable of generating free radical sites in the polyolefin, characterized in that the silicon compound is a polyorganosiloxane in which at least 50 mole % of the siloxane units are D units as herein defined and which contains at least one unsaturated group, characterized in that the unsaturated group is group of the formula —X—CH=CH—R" (I) or —X—C≡C—R" (II), in which X represents a divalent organic linkage having an electron withdrawing effect with respect to the —CH=CH— or —C≡C— bond and/or containing an aromatic ring or a further olefinic double bond or acetylenic unsaturation, the aromatic ring or the further olefinic double bond or acetylenic unsaturation being conjugated with the olefinic unsaturation of —X—CH=CH—R" or with the acetylenic unsaturation of —X—C≡C—R" and R" represents hydrogen or a group having an electron withdrawing effect or any other activation effect with respect to the —CH=CH— or —C≡C— bond.

Preferably, the polyorganosiloxane containing at least one group of the formula —X—CH=CH—R" (I) or —X—C≡C—R" (II) is deposited on a filler before being reacted with the polyolefin.

Preferably, the polyorganosiloxane containing at least one group of the formula —X—CH=CH—R" (I) or —X—C≡C—R" (II) and a filler are reacted in situ.

The invention provides a stabilised polymer blend comprising 5 to 95% by weight of a polyolefin and 95 to 5% by weight of a polyorganosiloxane in which at least 50 mole % of the siloxane units are D units as herein defined, the polyorganosiloxane being at least partly grafted to the polyolefin by bonds formed by free radical polymerization of unsaturated groups of the formula —X—CH=CH—R" (I) or —X—C≡C—R" (II) in the polyorganosiloxane, in which X represents a divalent organic linkage having an electron withdrawing effect with respect to the —CH=CH— or —C≡C— bond and/or containing an aromatic ring or a further olefinic double bond or acetylenic unsaturation, the aromatic ring or the further olefinic double bond or acetylenic unsaturation being conjugated with the olefinic unsaturation of —X—CH=CH—R" or with the acetylenic unsaturation of —X—C≡C—R" and R" represents hydrogen or a group having an electron withdrawing effect or any other activation effect with respect to the —CH=CH— or —C≡C— bond.

The invention encompasses the use of a polyorganosiloxane in which at least 50 mole % of the siloxane units are D units as herein defined and which contains at least one group of the formula —X—CH=CH—R" (I) or —X—C≡C—R" (II), in which X represents a divalent organic linkage having an electron withdrawing effect with respect to the —CH=CH— or —C≡C— bond, and R" represents hydrogen or a group having an electron withdrawing effect or any other activation effect with respect to the —CH=CH— or —C≡C— bond, in grafting silicone moieties to a polyolefin, to give enhanced grafting compared to an unsaturated silicone not containing a —X—CH=CH—R" or —X—C≡C—R" group.

The invention encompasses the use of a polyorganosiloxane in which at least 50 mole % of the siloxane units are D units as herein defined and which contains at least one group of the formula —X—CH=CH—R" (I) or —X—C≡C—R" (II), in which X represents a divalent organic linkage containing an aromatic ring or a further olefinic double bond or acetylenic unsaturation, the aromatic ring or the further olefinic double bond or acetylenic unsaturation being conjugated with the olefinic unsaturation of —X—CH=CH—R" or with the acetylenic unsaturation of —X—C≡C—R" and R" represents hydrogen or a group having an electron withdrawing effect or any other activation effect with respect to the —CH=CH— or —C≡C— bond, in grafting silicone moieties to a polyolefin, to give grafting with less degradation of the polyolefin compared to an unsaturated silicone not containing a —X—CH=CH—R" or —X—C≡C—R" group.

The invention is illustrated by the following Examples.

Raw Materials

The polymers used were:

PP=Isotactic polypropylene homopolymer supplied as Borealis® HB 205 TF (melt flow index MFR 1 g/10 min at 230° C./2.16 kg measured according to ISO 1133);

PPH=Polypropylene homopolymer sold by Total Petrochemicals® as PPH 7060 (MFR 12 g/10 min, 230° C./2.16 kg); Porous PP was microporous polypropylene supplied by Membrana as Accurel® XP100. This microporous polymers was used for absorbing liquid ingredients. Characteristics of Accurel® XP100 are MFR (2.16 kg/230° C.) 2.1 g/10 min (method IS01133), and melting temperature (DSC) 156° C.

The filler used was:

Wood Flour=Pine Wood Flour sold by American Wood Fibers®

The reference coupling agent used was:

MAg-PP=Orevac® CA 100, maleic anhydride grafted polypropylene (MFR 150-200 g/10 min, 230° C./2.16 kg) sold by Arkema®.

The peroxide used is:

DHBP was 2,5-dimethyl-2,5-di-(tert-butylperoxy) hexaneperoxide supplied as Arkema Luperox® 101 peroxide;

Other raw materials used were:

Styrene was 99% pure supplied by Sigma-Aldrich Reagent Plus® (ref. S4972).

Ethyl sorbate 98% supplied by Sigma-Aldrich Reagent Plus® (ref. 177687).

α,ω-di-hydroxy functional polydimethylsiloxane HO—[Si(Me$_2$)-O]$_n$—H with various values for n, i.e. various polymerization degree (DP) were sourced internally from Dow Corning®.

Anti-oxidants used were:

Irgafos 168 was tris-(2,4-di-tert-butylphenyl)phosphite antioxidant supplied by Ciba as Irgafos® 168

Irganox 1010 was tetrakis [methylene-3-(3,5-di-tert-butyl-4-hydroxyphenyl-propionate)]methane phenolic antioxidant supplied by Ciba as Irganox® 1010.

Sorbyloxypropyltrimethoxysilane was prepared from sorbic acid, by reaction of a sorbate salt with chloropropyltrimethoxysilane. Potassium sorbate was reacted with chloropropyltrimethoxysilane in the presence of tetrabutylammonium bromide (TBAB) as phase transfer catalyst at a reaction temperature within the range 100 to 160° C. in an alkane solvent with removal of potassium chloride by-product by filtration.

γ-Acryloxypropyltrimethoxysilane (γ-ATM) was prepared from allyl acrylate and trimethoxysilane by the process described in U.S. Pat. No. 3,179,612.

EXAMPLE 1

α,ω-di-Sorbyloxypropylsilicate functional polydimethylsiloxane (Sorbate-PDMS) Me—CH=CH—CH=CH—(C=O)—O—(CH$_2$)$_3$—Si(OMe)$_2$-O—[Si(Me$_2$)-O]$_n$—Si(OMe)$_2$-(CH$_2$)$_3$—O—(C=O)—CH=CH—CH=CH-Me where n=4 was prepared by reacting hydroxy-terminated polydimethylsiloxane (Hydroxy-PDMS) of DP=4 with equimolar amount (to the hydroxy-functions molar amount) of sorbyloxypropyltrimethoxysilane. Materials were stirred together for a few minutes under nitrogen, 2 g of titanium n-butoxide were then added under stirring. The mixing was continued until the product became totally homogeneous. Characterization of the polymer product formed confirmed the formation of sorbyloxypropylsilicate functional polydimethylsiloxane of chain group structure —SiR(OR')$_2$ wherein R is sorbyloxypropyl and each R' is methyl.

10 parts by weight porous PP pellets were tumbled with 6.2 parts by weight Sorbate-PDMS prepared above and 0.2 parts DHBP until the liquid reagents were absorbed by the polypropylene to form a silane masterbatch.

100 parts by weight Borealis® HB 205 TF polypropylene pellets were loaded in a Brabender® Plastograph 350E mixer equipped with roller blades, in which compounding was carried out. Filling ratio was set to 0.7. Rotation speed was 50 rpm, and the temperature of the chamber was maintained at 190° C. Torque and temperature of the melt were monitored for controlling the reactive processing of the ingredients. The PP was loaded in three portions allowing 1 minute fusion/mixing after each addition. The silane masterbatch was then added and mixed for 4 minutes to start the grafting reaction. 0.5 parts Irganox 1010 and 0.5 parts Irgafos 168 antioxidants were then added and mixed for a further 1 minute during which grafting continued. The melt was then dropped from the mixer and cooled down to ambient temperature. The resulting grafted polypropylene was moulded into 2 mm thick sheet on an Agila® PE30 press at 210° C. for 5 minutes before cooling down to ambient temperature at 15° C./min with further pressing.

EXAMPLE 2

Sorbate-PDMS of the same formula but with n=12 was prepared by the process of Example 1 from hydroxy-terminated polydimethylsiloxane of DP=12.

Grafting of polypropylene was carried out as described in Example 1 but replacing Sorbate-PDMS with n=4 by an equimolar amount of Sorbate-PDMS with n=12, as shown in Table 1.

EXAMPLES 3 TO 5

Sorbate-PDMS with various siloxane chain length as shown in Table 1 were prepared by the process of Example 1 from hydroxy-terminated polydimethylsiloxane of corresponding DP.

Grafting of polypropylene was carried out as described in Example 2 but replacing Sorbate-PDMS with n=12 by an equal weight of the Sorbate-PDMS of each of Examples 3 to 5, as shown in Table 1.

TABLE 1

| | Example 1 | Example 2 | Example 3 | Example 4 | Example 5 |
|---|---|---|---|---|---|
| PP | 100 | 100 | 100 | 100 | 100 |
| Porous PP | 10 | 10 | 10 | 10 | 10 |
| DHBP | 0.2 | 0.2 | 0.2 | 0.2 | 0.2 |
| Irganox ® 1010 | 0.5 | 0.5 | 0.5 | 0.5 | 0.5 |
| Irgafos ® 168 | 0.5 | 0.5 | 0.5 | 0.5 | 0.5 |
| Sorbate-PDMS (with n = 4) | 6.2 | — | 11.2 | — | — |
| Sorbate-PDMS (with n = 12) | — | 11.2 | — | — | — |
| Sorbate-PDMS (with n = 300) | — | — | — | 11.2 | — |
| Sorbate-PDMS (with n = 45) | — | — | — | — | 11.2 |
| Polypropylene Tg (as DMTA E" max) (° C.) | 2 | 3 | 1 | 7 | 4 |
| PDMS Tg (as DMTA E" max) (° C.) | — | −104 | — | −121 | −120 |
| TGA, onset (° C.) | 352 | 376 | 358 | 349 | 374 |

TABLE 1-continued

|  | Example 1 | Example 2 | Example 3 | Example 4 | Example 5 |
|---|---|---|---|---|---|
| TGA, 50% weight loss (° C.) | 383 | 388 | 378 | 385 | 394 |

EXAMPLE 6

α,ω-di-Acryloxypropylsilicate functional polydimethylsiloxane (Acrylate-PDMS) $H_2C=CH-(C=O)-O-(CH_2)_3-Si(OMe)_2-O-[Si(Me_2)-O]_n-Si(OMe)_2-(CH_2)_3-O-(C=O)-CH=CH_2$ where n=12 was prepared by reacting hydroxy-terminated polydimethylsiloxane of DP=12 with equimolar amount (to the hydroxy-functions molar amount) of Acryloxypropyltrimethoxysilane (Dow Corning® Z-6530). Materials were stirred together for a few minutes under nitrogen, 2 g of titanium n-butoxide were then added under stirring. The mixing was continued until the product became totally homogeneous. Characterization of the polymer product formed confirmed the formation of acryloxypropylsilicate functional polydimethylsiloxane of chain group structure $-SiR(OR')_2$ wherein R is acryloxy and each R' is methyl.

Example 2 was repeated replacing Sorbate-PDMS by an equimolar amount of Acrylate-PDMS with n=12 as shown in Table 2.

EXAMPLES 7 AND 8

Example 6 was repeated adding different radical stabilizing co-agents in an equimolar ratio to Acrylate-PDMS with n=12 as shown in Table 2.

EXAMPLES 9

Example 6 was repeated using higher loading of Acrylate-PDMS with n=12 as shown in Table 2.

TABLE 2

|  | Example 6 | Example 7 | Example 8 | Example 9 |
|---|---|---|---|---|
| PP | 100 | 100 | 100 | 100 |
| Porous PP | 10 | 10 | 10 | 10 |
| DHBP | 0.2 | 0.2 | 0.2 | 0.2 |
| Irganox ® 1010 | 0.5 | 0.5 | 0.5 | 0.5 |
| Irgafos ® 168 | 0.5 | 0.5 | 0.5 | 0.5 |
| Acryloxy-PDMS (with n = 12) | 10.6 | 10.6 | 10.6 | 24.4 |
| Styrene | — | 1.6 | — | — |
| Ethyl Sorbate | — | — | 2.1 | — |
| Polypropylene Tg (as DMTA E" max) (° C.) | 3 | 2 | 1 | 2 |
| PDMS Tg (as DMTA E" max) (° C.) | — | — | — | −109 |
| TGA, onset (° C.) | 369 | 378 | 367 | 363 |
| TGA, 50% weight loss (° C.) | 391 | 396 | 386 | 388 |

COMPARATIVE EXAMPLE C1 AND C2

Example 1 and 2 were repeated with the omission of peroxide and replacing Sorbate-PDMS by an equimolar amount of corresponding Hydroxy-PDMS (of DP respectively 4 and 12) as shown in Table 3.

COMPARATIVE EXAMPLE C3 TO C5

Comparative Examples 2 was repeated replacing Hydroxy-PDMS of DP=12 by an equal weight of the Hydroxy-PDMS of each of Comparative Examples C3 to C5, as shown in Table 3.

COMPARATIVE EXAMPLE C6

Example 9 was repeated with the omission of peroxide and replacing Sorbate-PDMS by an equimolar amount of corresponding Hydroxy-PDMS (of DP 12) as shown in Table 3.

TABLE 3

|  | Comparative Example C1 | Comparative Example C2 | Comparative Example C3 | Comparative Example C4 | Comparative Example C5 | Comparative Example C6 |
|---|---|---|---|---|---|---|
| PP | 100 | 100 | 100 | 100 | 100 | 100 |
| Porous PP | 10 | 10 | 10 | 10 | 10 | 10 |
| DHBP | — | — | — | — | — | — |
| Irganox ® 1010 | 0.5 | 0.5 | 0.5 | 0.5 | 0.5 | 0.5 |
| Irgafos ® 168 | 0.5 | 0.5 | 0.5 | 0.5 | 0.5 | 0.5 |
| Hydroxy-PDMS (DP = 4) | 2.5 | — | 7.0 | — | — | — |
| Hydroxy-PDMS (DP = 12) | — | 7.0 | — | — | — | 15 |
| Hydroxy-PDMS (DP = 300) | — | — | — | 7.0 | — | — |
| Hydroxy-PDMS (DP = 45) | — | — | — | — | 7.0 | — |
| Polypropylene Tg (as DMTA E" max) (° C.) | 5 | 7 | 5 | 8 | 7 | 6 |
| PDMS Tg (as DMTA E" max) (° C.) | — | −114 | −107 | −121 | −121 | −116 |
| TGA, onset (° C.) | 337 | 340 | 330 | 342 | 343 | 327 |
| TGA, 50% weight loss (° C.) | 366 | 363 | 363 | 364 | 369 | 359 |

Glass transition temperature (Tg) measurements were carried out using a DMA instrument Metravib 0.1 dB® Viscoanalyzer DMA50. A sample of a length of about 42 mm has been cut out from each sample moulded sheet, accurately measured dimensions were about: height 37.1 mm (stress direction), width 15 mm and thickness 2 mm. Sample was mounted into DMA equipment using grips designed for traction mode testing with jaws for rigid materials. A temperature sweep test ranging from −150° C. to +150° C. was carried out in traction mode applying dynamic displacement of $5\times10^{-5}$ m at a frequency of 10 Hz. Glass transition temperature (Tg) were reported as maximum of E" modulus over the temperature range.

All the samples showed the Tg of the Polypropylene, some of them show an additional peak of E" at low temperature corresponding to the Tg of the added polydimethylsiloxane. Tg are reported in Tables 1 to 3.

Thermal stability was measured by Thermo Gravimetric Analysis (TGA) on Mettler-Toledo® TGA851/SDTA instrument. Each compound was heated up to 950° C. in an Alumina pan of 70 µl, under air flow of 100 ml/min with accurate monitoring of weight loss upon heating. A background of an empty alumina pan was recorded in the same conditions and subtracted to the TGA of each sample (baseline correction).

Thermal stability is characterized by two temperatures: the temperature at which significant weight loss starts (onset) and the temperature at which 50% of initial sample weight is lost (50% weight loss); onset and 50% weight loss temperatures for Examples 1 to 9 and Comparative Examples C1 to C6 are reported in Tables 1 to 3.

Comparing each of Examples 1 to 5 with Comparative Examples C1 to C5 respectively, we can observe that Polypropylene Tg of Examples 1 to 5 were all lower than Polypropylene Tg of respective Comparative Example C1 to C5. In the same way, when the Tg of the added polydimethylsiloxane was detected, it was each time higher or equal for Examples 1 to 5 than for the respective Comparative Example C1 to C5. Driving Tg of both polymer closer to each other attested of better compatibization of polypropylene and polydimethylsiloxane in the formulations of our invention.

Comparing Examples 6 to 8 with Comparative Examples C2, we can observe that polypropylene Tg of Examples 6 was lower than Polypropylene Tg of Comparative Examples C2 which attests that better compatibization of polypropylene and polydimethylsiloxane in the formulations of our invention is also observed when replacing Sorbate-PDMS with Acrylate-PDMS. As demonstrated by Example 7 and 8, using styrene or ethyl sorbate as a co-agent in conjunction to the Acrylate-PDMS in order to prevent Polypropylene degradation during grafting did not affect polypropylene and polydimethylsiloxane compatibility, indeed lower polypropylene Tg is observed for Examples 7 and 8 than for Comparative Examples C2.

Comparing Examples 9 with Comparative Examples C6, we observed lower polypropylene Tg and higher polydimethylsiloxane Tg for Example 9 than for Comparative Example C6; this shows that increasing Acrylate-PDMS to Polypropylene ratio, better polypropylene and polydimethylsiloxane compatibility is still observed for the formulation of our invention.

Comparing each of Examples 1 to 5 with Comparative Examples C1 to C5 respectively, we observed that TGA onset and 50% weight loss temperatures of Examples 1 to 5 are all significantly higher than onset and 50% weight loss temperatures of respective Comparative Example C1 to C5. These higher degradation temperatures attested of better thermal stability of the formulations of our invention.

Comparing Examples 6 to 8 with Comparative Examples C2, we observed that TGA onset and 50% weight loss temperatures of Examples 6 to 8 were all significantly higher than onset and 50% weight loss temperatures of Comparative Example C2. This showed that, replacing Sorbate-PDMS with Acrylate-PDMS (Example 6), better thermal stability of the formulations of our invention vs. formulation using corresponding Hydroxy-PDMS (Comparative Example C2) is observed. Similarly, using styrene or ethyl sorbate as a co-agent in conjunction to the Acrylate-PDMS in order to prevent Polypropylene degradation during grafting (Examples 7 and 8), better thermal stability of the formulation of our invention was also observed.

Comparing Examples 9 with Comparative Examples C6, we observed higher onset and 50% weight loss temperatures for Example 9 than for Comparative Example C6; this showed that increasing Acrylate-PDMS to Polypropylene ratio, better thermal stability was still observed for the formulation of our invention.

EXAMPLE 10

Compound of Sorbate-PDMS with n=4 of Example 1 with polypropylene and 25% by weight wood flours was prepared according to formulation in Table 4.

EXAMPLE 11

Compound of Sorbate-PDMS with n=12 of Example 2 with polypropylene and 25% by weight wood flours was prepared according to formulation in Table 4. Sorbate-PDMS amount in Example 11 is equimolar sorbate function amount than in Example 10.

COMPARATIVE EXAMPLES C7

Example 1 was repeated with the omission of γ-ATM, Sorbate-PDMS and DHBP as shown in Table 4.

COMPARATIVE EXAMPLES C8

Comparative Example C7 was repeated with the addition of MAg-PP as shown in Table 4.

Compounds of Examples 10 and 11 and Comparative Examples C7 and C8 were prepared according to a continuous process using a Brabender® DSE 20/40 co-rotating twin screw extruder having screw diameter of 20 mm and L/D=40. Screws rotation speed was 200 rpm and temperature profile of the 6 heating zones was the following:
T1=180° C.;
T2=180° C.;
T3=190° C.;
T4=190° C.;
T5=190° C.;
T6=180° C.

Polymer and MAgPP were fed via barrel opening at 1 D, using gravimetric feeder Brabender Technologie® DSR28, Wood Flour was fed via barrel opening at 1 D, using gravimetric feeder Brabender Technologie® DDSR20, Liquids were fed using a membrane pump ProMinent® Mikro g5/a connected to the barrel opening at 10 D. Powdery anti-oxidants were fed via barrel opening at 20 D using gravimetric feeder Brabender Technologie® DDW-MD1-MT12. Atmospheric venting was performed through barrel opening at 30 D. Total extrusion throughput was 3.5 kg/h.

The compositions tested are shown in Table 4.

The resulting compounds were then shaped into 4 mm thick multipurpose specimens conforming to ISO-3167 by injection moulding according to ISO-294. Mechanical performances of each compound were evaluated by tensile testing of these specimens according to ISO-527 as well as Unnotched Instrumented Charpy Impact Resilience according to ISO-179-2. Results obtained are shown in Table 4

Comparing Examples 10 and 11 with Comparative Example C7, we observed that Examples 10 and 11 showed higher Tensile modulus, higher Yield, higher Elongation at break and higher Impact resistance than Comparative Example C7. This showed that formulations of our invention have enhanced physical/mechanical properties compared to formulation prepared from the same polyolefin without grafting or crosslinking.

Comparing Examples 10 and 11 with Comparative Example C8, we observed that formulations of our invention (Examples 10 and 11) had enhanced physical/mechanical properties compared to formulation prepared from the same polyolefin with the addition of well known MAg-PP coupling agent (Comparative Example C8).

TABLE 4

|  | Example 10 | Example 11 | Comparative Example C7 | Comparative Example C8 |
|---|---|---|---|---|
| PPH | 71 | 70 | 74 | 71 |
| MAg-PP |  |  |  | 3 |
| Irganox ® 1010 | 0.5 | 0.5 | 0.4 | 0.4 |
| Irgafos ® 168 | 0.5 | 0.5 | 0.4 | 0.4 |
| Wood Flour | 25 | 25 | 25 | 25 |
| γ-ATM | 0.9 | 0.9 |  |  |
| Sorbate-PDMS (with n = 4) | 1.6 |  |  |  |
| Sorbate-PDMS (with n = 12) |  | 2.7 |  |  |
| DHBP | 0.2 | 0.2 |  |  |
| Tensile Modulus (MPa) | <u>2774</u> | <u>2677</u> | 2564 | 2553 |
| Tensile Yield point (MPa) | <u>43.8</u> | <u>41.8</u> | 31.4 | 35 |
| Elongation @ break (%) | <u>6.2</u> | <u>7.1</u> | 6 | 5.7 |
| Impact (unnotched charpy) (kJ/m²) | <u>20</u> | <u>23</u> | 15 | 17 |

The invention claimed is:

1. A composition comprising a polyolefin, a filler and a polyorganosiloxane in which at least 50 mole % of the siloxane units are $R_2SiO_{2/2}$ (D units, in which each R represents an organic group or hydrogen or a hydroxyl group) and which contains at least one sorbyloxyalkyl group of formula —X—CH=CH—R″, where X is C(=O)OR*, R* represents a divalent hydrocarbon moiety, and R″ represents $CH_3$—CH=CH—, the filler includes aluminium trihydroxide, magnesium dihydroxide, kaolin, non-hydrated, partially hydrated or hydrated fluorides, chlorides, bromides, iodides, chromates, hydroxides, phosphates, hydrogen phosphates, nitrates, oxides and sulphates of sodium, potassium, magnesium, calcium, and barium; zinc oxide, aluminium oxide, antimony pentoxide, antimony trioxide, beryllium oxide, chromium oxide, iron oxide, lithopone, boric acid or a borate salt, zinc borate, barium metaborate or aluminium borate, mixed metal oxides, aluminosilicate, vermiculite, silica including fumed silica, fused silica, precipitated silica, quartz, sand, and silica gel; rice hull ash, ceramic and glass beads, zeolites, aluminium flakes or powder, bronze powder, molybdenum, nickel, stainless steel powder, tungsten, hydrous calcium silicate, barium titanate, silica-carbon black composite, cement, fly ash, slate flour, bentonite, clay, talc, anthracite, apatite, attapulgite, boron nitride, cristobalite, diatomaceous earth, dolomite, ferrite, feldspar, graphite, calcined kaolin, molybdenum disulfide, perlite, pumice, pyrophyllite, sepiolite, zinc stannate, zinc sulfide or wollastonite.

2. A composition according to claim 1, wherein the polyorganosiloxane comprises 2 to 2000 siloxane units and at least 90 mole % of the siloxane units are D units.

3. A composition according to claim 1, wherein the polyorganosiloxane is a linear polydiorganosiloxane having terminal sorbyloxyalkyl groups of the formula —X—CH=CH—R″ (I) at both ends of the polydiorganosiloxane molecule.

4. A composition according to claim 1, wherein the polyorganosiloxane has at least one pendant sorbyloxyalkyl group.

5. A composition according to claim 1, wherein the sorbyloxyalkyl groups are bonded to the polyorganosiloxane by a C—Si bond.

6. A polyorganosiloxane in which at least 50 mole % of the siloxane units are $R_2SiO_{2/2}$ (D units, in which each R represents an organic group or hydrogen or a hydroxyl group) and which contains at least one sorbyloxyalkyl group of formula —X—CH=CH—R″ (I), where X is C(=O)OR*, R* represents a divalent hydrocarbon moiety, and R″ represents $CH_3$—CH=CH—.

7. A polyorganosiloxane according to claim 6, wherein the sorbyloxyalkyl group is a sorbyloxypropyl group of formula $CH_3$—CH=CH—CH=CH—C(=O)O—$(CH_2)_3$.

8. A composition comprising a filler, 5 to 95% by weight of a polyolefin and 95 to 5% by weight of a polyorganosiloxane as defined in claim 6, the filler includes aluminium trihydroxide, magnesium dihydroxide, kaolin, non-hydrated, partially hydrated or hydrated fluorides, chlorides, bromides, iodides, chromates, hydroxides, phosphates, hydrogen phosphates, nitrates, oxides and sulphates of sodium, potassium, magnesium, calcium, and barium; zinc oxide, aluminium oxide, antimony pentoxide, antimony trioxide, beryllium oxide, chromium oxide, iron oxide, lithopone, boric acid or a borate salt, zinc borate, barium metaborate or aluminium borate, mixed metal oxides, aluminosilicate, vermiculite, silica including fumed silica, fused silica, precipitated silica, quartz, sand, and silica gel; rice hull ash, ceramic and glass beads, zeolites, aluminium flakes or powder, bronze powder, molybdenum, nickel, stainless steel powder, tungsten, hydrous calcium silicate, barium titanate, silica-carbon black composite, cement, fly ash, slate flour, bentonite, clay, talc, anthracite, apatite, attapulgite, boron nitride, cristobalite, diatomaceous earth, dolomite, ferrite, feldspar, graphite, calcined kaolin, molybdenum disulfide, perlite, pumice, pyrophyllite, sepiolite, zinc stannate, zinc sulfide or wollastonite.

9. A composition according to claim 1, wherein an organic peroxide compound capable of generating free radical sites in the polyolefin is present at 0.01 to 2% by weight of the total composition.

10. A process for the preparation of a polyorganosiloxane as claimed in claim 6, wherein a polyorganosiloxane in which at least 50 mole % of the siloxane units are $R_2SiO_{2/2}$ (D units, in which each R represents an organic group or hydrogen or a hydroxyl group) and which contains at least one Si—OH group is reacted with an alkoxysilane containing a sorbyloxyalkyl group of formula —X—CH=CH—R″ (I), where X is C(=O)OR*, R* represents a divalent hydrocarbon moiety, and R″ represents $CH_3$—CH=CH—.

11. A process for grafting silicone onto a polyolefin, comprising reacting the polyolefin with a silicon compound containing an unsaturated group in the presence of means capable of generating free radical sites in the polyolefin, wherein the silicon compound is a polyorganosiloxane in which at least 50 mole % of the siloxane units are $R_2SiO_{2/2}$ (D units, in which each R represents an organic group or hydrogen or a hydroxyl group) and which contains at least one unsaturated group, wherein the unsaturated group is a sorbyloxyalkyl group of formula —X—CH=CH—R″ (I), where X is C(=O)OR*, R* represents a divalent hydrocarbon moiety, and R″ represents $CH_3$—CH=CH—.

12. A process according to claim 11, wherein the polyorganosiloxane containing at least one unsaturated group is deposited on a filler before being reacted with the polyolefin.

13. A process according to claim 11, wherein the polyolefin, the polyorganosiloxane containing at least one unsaturated group and a filler are reacted in situ.

14. A stabilised polymer blend comprising a polyolefin, a filler and a polyorganosiloxane in which at least 50 mole % of the siloxane units are $R_2SiO_{2/2}$ (D units, in which each R represents an organic group or hydrogen or a hydroxyl group), the polyorganosiloxane being at least partly grafted to the polyolefin by bonds formed by free radical polymerization of sorbyloxyalkyl groups, where the sorbyloxyalkyl groups have formula —X—CH=CH—R" (I), where X is C(=O)OR*, R* represents a divalent hydrocarbon moiety, and R" represents $CH_3$—CH=CH—.

15. A stabilised polymer blend comprising a polyolefin and a polyorganosiloxane in which at least 50 mole % of the siloxane units are $R_2SiO_{2/2}$ (D units, in which each R represents an organic group or hydrogen or a hydroxyl group), the polyorganosiloxane being at least partly grafted to the polyolefin by bonds formed by free radical polymerization of a sorbyloxyalkyl group of formula —X—CH=CH—R" (I), where X is C(=O)OR*, R* represents a divalent hydrocarbon moiety, and R" represents $CH_3$—CH=CH— in the polyorganosiloxane.

16. The stabilized polymer blend of claim 15, wherein the sorbyloxyalkyl group is a sorbyloxypropyl group.

17. The stabilized polymer blend of claim 15, where the polyolefin is polypropylene.

18. The stabilized polymer blend of claim 15, wherein the sorbyloxyalkyl groups are bonded to the polyorganosiloxane by a C—Si bond.

19. The stabilized polymer blend of claim 18, wherein the polyorganosiloxane is a linear polydiorganosiloxane having terminal sorbyloxyalkyl groups at both ends of the polydiorganosiloxane molecule.

20. The stabilized polymer blend of claim 18, wherein the polyorganosiloxane has at least one pendant sorbyloxyalkyl group.

* * * * *